United States Patent
Roy

(10) Patent No.: US 6,871,769 B2
(45) Date of Patent: Mar. 29, 2005

(54) APPARATUS AND METHOD FOR ASSEMBLING A PICTURE FRAME JOINT

(75) Inventor: Armand E. Roy, Attleboro, MA (US)

(73) Assignee: Craft, Inc., South Attleboro, MA (US)

( * ) Notice: Subject to any disclaimer, the term of this patent is extended or adjusted under 35 U.S.C. 154(b) by 178 days.

(21) Appl. No.: 10/249,405

(22) Filed: Apr. 7, 2003

(65) Prior Publication Data

US 2004/0194279 A1 Oct. 7, 2004

(51) Int. Cl.$^7$ .............................................. B25C 5/10
(52) U.S. Cl. ........................ 227/152; 227/19; 29/428; 29/445; 29/525
(58) Field of Search ..................... 227/152, 19, 148, 227/149; 29/235, 428, 445, 450, 525.01

(56) References Cited

U.S. PATENT DOCUMENTS

| | | | | |
|---|---|---|---|---|
| 3,899,858 A | | 8/1975 | Zanker | 52/172 |
| 4,296,587 A | | 10/1981 | Berdan | 52/788 |
| 4,348,127 A | | 9/1982 | Hays, Jr. | 403/9 |
| 4,403,434 A | | 9/1983 | Jenkins | 40/152 |
| 4,531,315 A | | 7/1985 | Sobel | 40/155 |
| 4,547,986 A | | 10/1985 | Sherman | 40/155 |
| 4,572,420 A | * | 2/1986 | Pistorius | 227/110 |
| 4,574,452 A | * | 3/1986 | Kennedy et al. | 29/432 |
| 4,830,257 A | * | 5/1989 | Lin | 227/152 |
| 4,862,612 A | * | 9/1989 | Sugihara et al. | 40/782 |
| 4,892,435 A | | 1/1990 | Anderson | 403/374 |
| 4,974,352 A | | 12/1990 | Shwu-Jen | 40/152 |
| 4,993,866 A | | 2/1991 | Sugihara et al. | 403/402 |
| 5,390,842 A | * | 2/1995 | Joyce | 227/110 |
| 5,419,064 A | | 5/1995 | Bennett | 40/155 |
| 5,903,963 A | * | 5/1999 | Bella et al. | 29/243.5 |

\* cited by examiner

*Primary Examiner*—Scott A. Smith
*Assistant Examiner*—Gloria R. Weeks
(74) *Attorney, Agent, or Firm*—Barlow, Josephs & Holmes, Ltd.

(57) ABSTRACT

An apparatus for assembling a picture frame joint includes a support plate with a pair of fences mounted thereto. A pair of impact pins are slidably mounted through apertures in the support plate and are interconnected to one another via a cam linkage arrangement to enable the impact pins to be actuated simultaneously using one air cylinder. The pins are mounted on trucks that slide within respective brackets on the bottom surface of the support plate. Two mating picture frame members are loosely assembled with an impact sensitive connector therebetween. The pair of impact pins simultaneously impact the connector on its opposing ends to respectively secure the connector to the picture frame members thereby securing them together to form a completed picture frame corner joint.

24 Claims, 16 Drawing Sheets

APPARATUS AND METHOD FOR ASSEMBLING A PICTURE FRAME JOINT

BACKGROUND OF INVENTION

The present invention relates generally to hardware used for picture frames and the assembling of picture frames. More specifically, the present invention relates to apparatuses and hardware used to assemble various picture frame components together, such as "channel" or "profile" picture frame components for the construction of a picture frame.

In the industry, these known picture frame components are typically manufactured of aluminum but may be of other materials, such as molded plastic. Typically, these frames include a total of four members with ends mitered at 45 degrees so that they may neatly mate with one another to form the frame. There is a need in the art to secure the mitered ends together to maintain the frame in its desired shape.

Also in the industry, wood frames are also employed. These frames must be nailed, glued or stapled together. However, with metal frames, such as the above "channel" frames made of aluminum with a channel therein, some type of joint connector must be employed to secured the ends to each other. Known picture frame joints in the prior art typically include an L-shaped plate with two short threaded fasteners through female threaded apertures on each of the two legs of the L-shaped plate. The bottom of the screw members communicate with a thrust plate which is, essentially, the same size and dimension of the main plate but does not have any threaded apertures. These two members are mated together and inserted into the frame to form a "set screw" configuration. As the screws are threaded through the female apertures, the bottom of the screws emanate further below the main member to cause the main member and the thrust plate to be urged further away from each other. Since these two members are residing within a channel in the aluminum frame, the joint is secured therein in clamping fashion. Of course, a second frame member is provided 90 degrees to the one provided to, in turn, form the desired square or rectangular configuration. This prior art construction requires the formation of the threaded bores as well as the tapping of the screws for shipping. However, it is common for these screw members to back out of their respective bores during transit requiring replacement and further handling for installation.

A number of new connectors in the art are known that are suitable for replacing the well-known "set-screw" plate connector of the prior art. For example, impact sensitive connectors can be employed to joint two picture frame members together to form a completed picture frame. For example, commonly owned pending U.S. Ser. No. 10/054,050, filed on Jan. 22, 2002 and U.S. Ser. No. 10/248,764, filed Feb. 14, 2003, which are incorporated herein by reference, disclose such impact sensitive connectors for assembling picture frames members together. These impact sensitive connectors are typically installed using a hand operated tool to impart the requisite impact to secure the connector to the picture frame member, such as a rotatable eccentrically positioned pin, to assemble the completed frame. While the new impact sensitive connectors are far superior to the prior art plate connectors of the set-screw type for the reasons discussed above, picture frames using the new impact sensitive connectors are time consuming to assemble because they require manual assembly using a specialized tool.

In view of the foregoing, there is a demand for an apparatus that automates the process of assembling a picture frame using impact sensitive corner joint connectors. There is also a demand for an apparatus that can assemble a picture frame joint much faster that a picture frame joint that is manually assembled. There is a further demand for an automated machine that is easy to operate and maintain. There is a particular demand for an apparatus that can more effectively assemble a picture frame joint than a manually assembled joint yet be significantly less labor intensive. There is a demand to provide a complete automated replacement to the prior art plate set-screw type of picture frame corner joint connector.

SUMMARY OF INVENTION

The present invention preserves the advantages of prior art picture frame joints, related hardware and apparatuses for installing such hardware onto picture frames. In addition, it provides new advantages not found in currently available apparatuses and overcomes many disadvantages of such currently available apparatuses.

The invention is generally directed to a novel apparatus for assembling a picture frame joint together using a unique picture frame joint connector. More specifically, the present invention is well-suited for assembling a corner joint of picture frame members that are of the channel type which are either extruded, machined or molded with an elongated channel running longitudinally therethrough.

The apparatus for assembling a picture frame joint of the present invention includes a support plate with a pair of fences mounted thereto. A pair of impact pins are slidably mounted through apertures in the support plate and are interconnected to one another via a cam linkage arrangement to enable the impact pins to be actuated simultaneously using one air cylinder or other similar actuating mechanism. The linkage can also be pneumatically, mechanically or electrically actuated. The pins are mounted on trucks that slide within respective brackets on the bottom surface of the support plate. According to the method of assembling a picture frame joint according to the present invention, two mating picture frame members are loosely assembled with a unique impact sensitive connector therebetween. The pair of impact pins simultaneously impact the connector on its opposing ends to respectively secure the connector to the picture frame members thereby securing them together to form a completed picture frame corner joint.

It is therefore an object of the present invention to provide an apparatus for assembling a picture frame joint that automates the process of assembling a channel-type picture frame joint.

It is an object of the invention to replace the well known picture frame joint of the "set screw" type.

A further object of the present invention is to provide an apparatus for assembling a picture frame joint that quickly assembles a picture frame joint. Another object is to provide an apparatus that is easy to operate.

A further object of the present invention is to provide an apparatus that is less labor intensive that prior art assembly methods which require manual assembly of a picture frame joint.

BRIEF DESCRIPTION OF DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION

Figure 1:
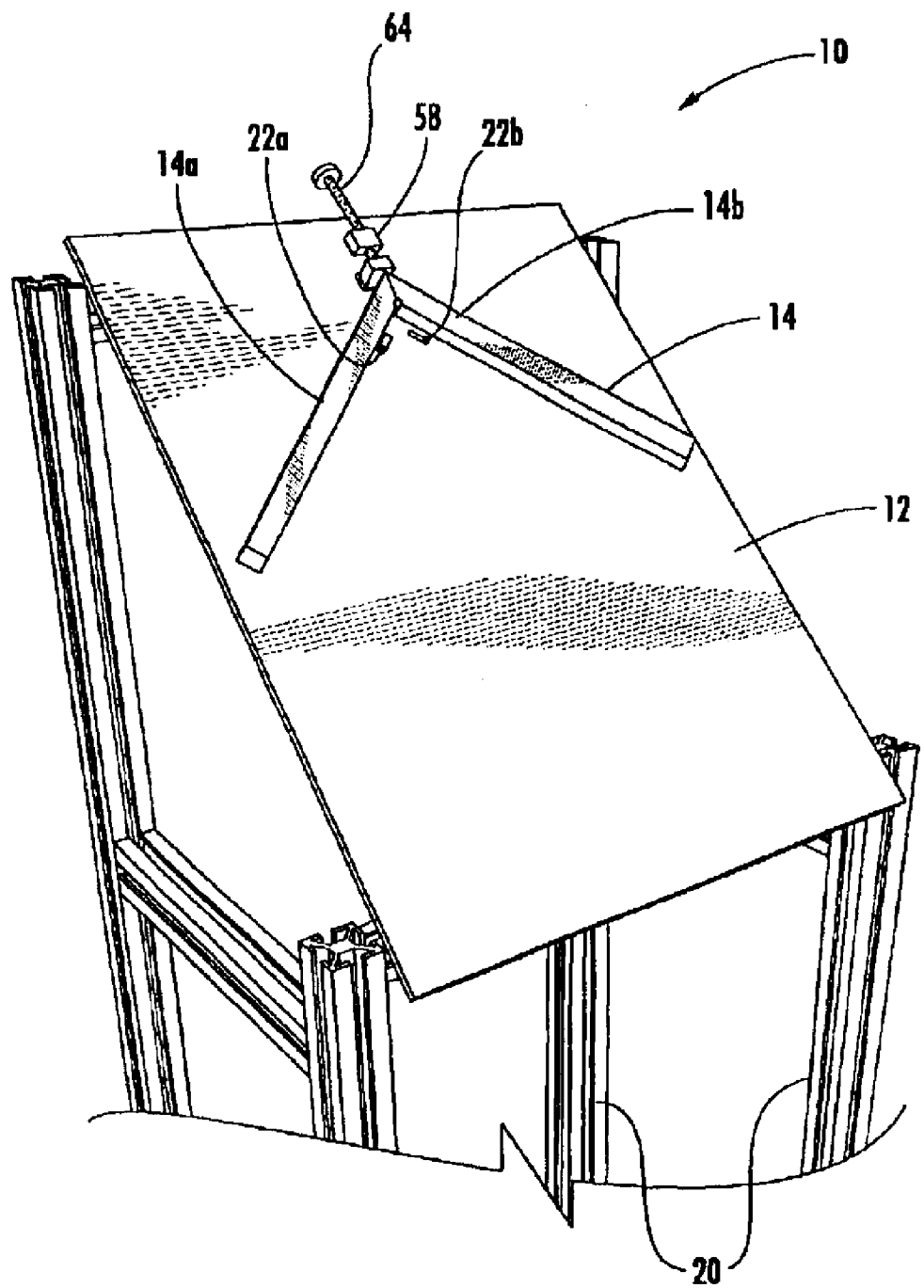
FIG. 1 is a top perspective view of the apparatus of the present invention for assembling a picture frame joint.

Referring first to FIG. 1, a front perspective view of the apparatus 10 of the present invention is shown. A support plate is provided with a fence, generally referred to as 14, positioned thereon. The fence 14 is preferably of an L-shaped configuration where a first fence member 14a is positioned 90 degrees from a second fence member 14b to form a desirable 90 degree picture frame joint to form a completed picture frame (not shown). As will be described below in connection with FIGS. 11 and 12, two picture frame members 16a, 16b, generally referred to as 16, are mated together at a 90 degree angle from one another via a 45 degree miter joint and are positioned against their respective fence members 14a and 14b. An impact sensitive connector 18 is installed in both of the picture frame members 16a and 16b to join them together.

As can be understood, the fence members 14a and 14b can also be positioned at an angle other than 90 degrees to form picture frames that do not have 90 degree corners. For ease of illustration and explanation, a 90 degree corner joint will be discussed in detail herein.

In FIG. 1, the support plate 12 is mounted on a body frame 20 to position it at a height and angle relative to the ground for easier access by an operator of the apparatus 10. A pair of actuatable impact pins 22a and 22b, corresponding to each fence member 14a, 14b, are positioned proximal thereto to engage with corresponding ends of the connector 18, as will be discussed in detail in FIGS. 8–13. Preferably, the impact pins 22a and 22b extend through the support plate 12 via apertures 24a and 24b and are controlled by a cam linkage mechanism 26 as will be described in connection with FIGS. 13–16.

Figure 2:
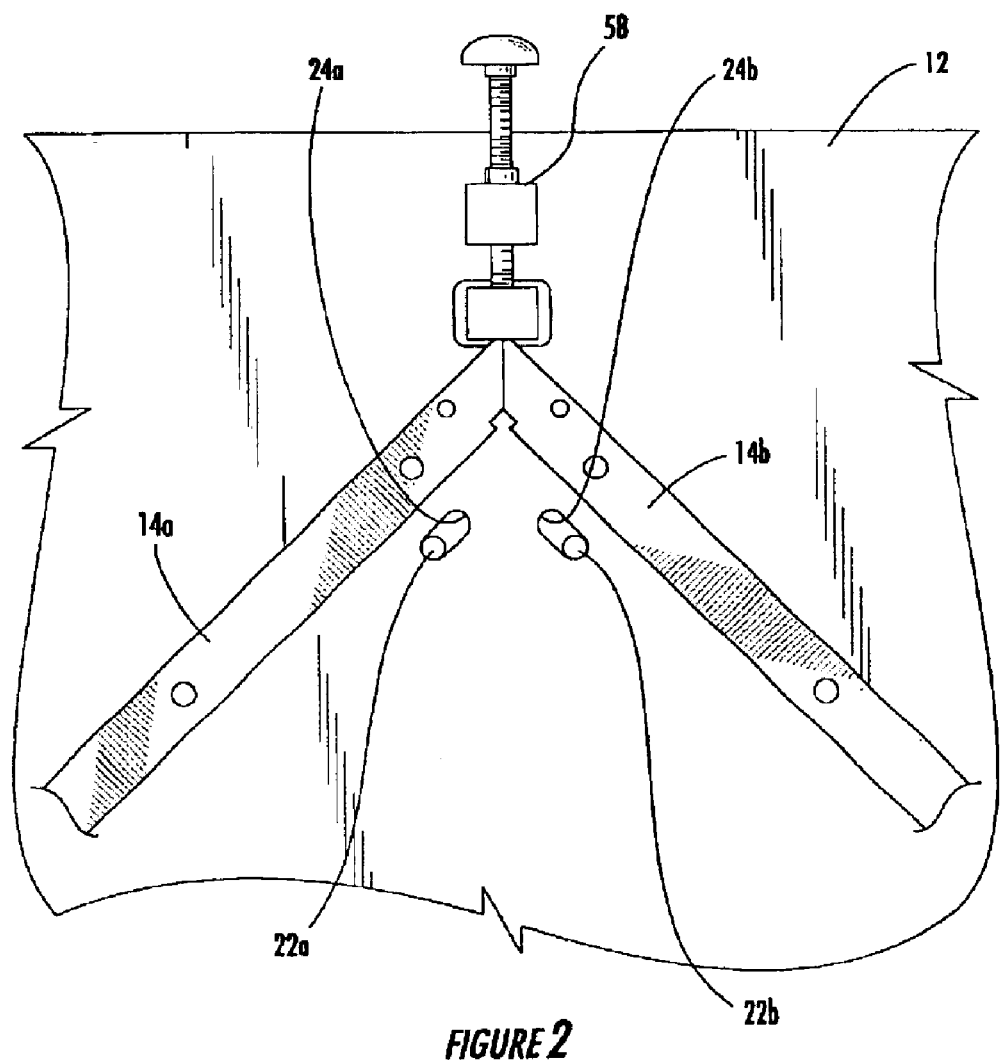
FIG. 2 is a top close-up view of the apparatus of FIG. 1 with impact pins in a resting position.
Figure 8:
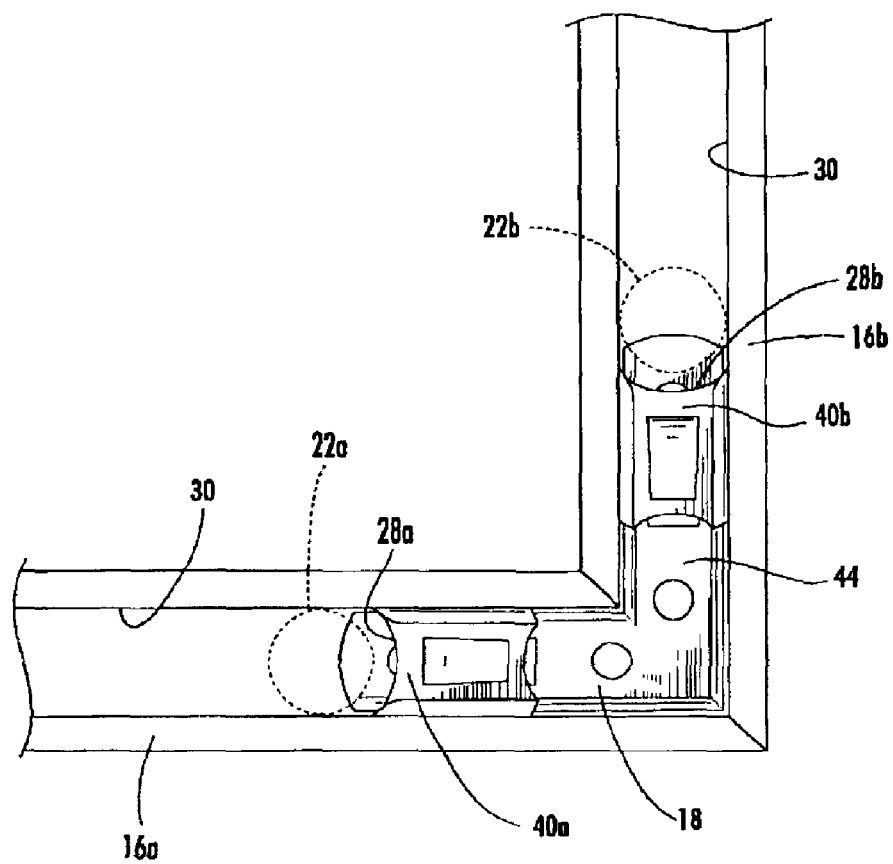
FIG. 8 is a top view of a connector loosely installed within the picture frame members prior to impact by the impact pins.
Figure 9:
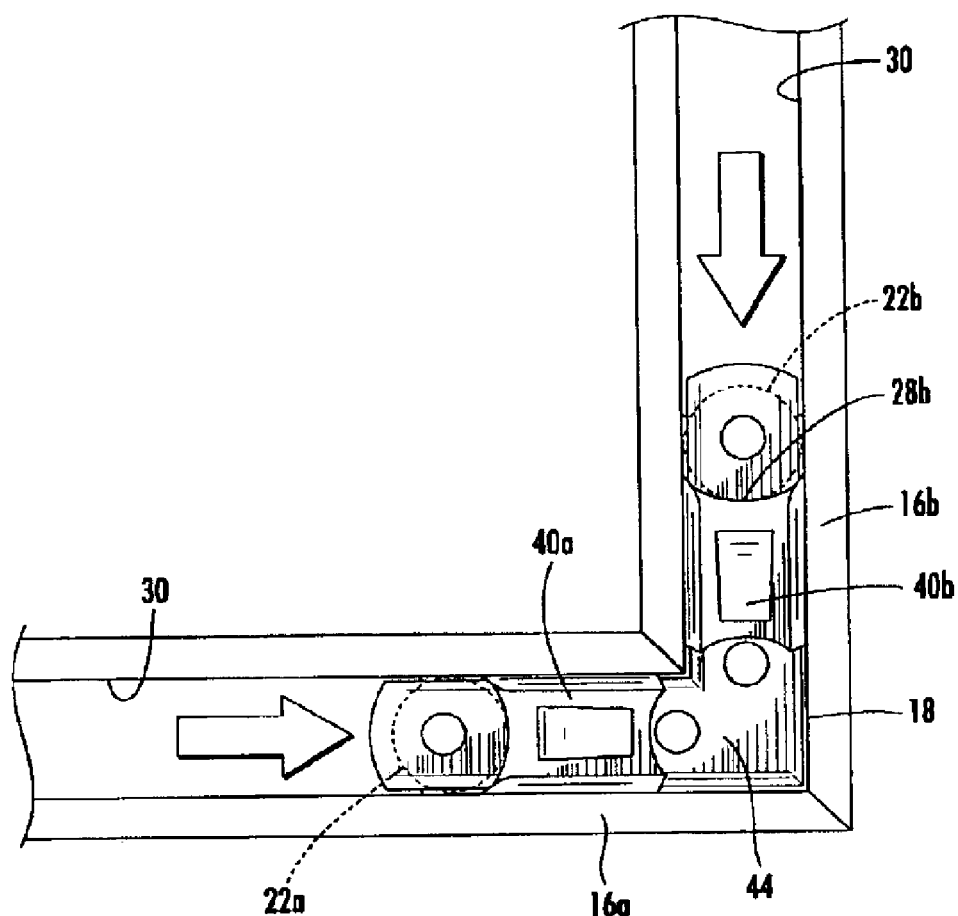
FIG. 9 is a top view of a connector securely installed within the picture frame members after impact by the impact pins.

Turning now to FIG. 2, a close up top view of the apparatus 10 of the present invention is shown. The fence members 14a and 14b are mounted on the support plate 12 by bolts (not shown), or the like. The impact pins 22a and 22b are movable between a resting position, as shown in FIG. 2 to an impact position shown in FIG. 3. The pins 22a, 22b impact opposing ends 28a, 28b of the unique impact sensitive connector 18, shown in FIGS. 4–7, to secure two picture frame members 16a and 16b together, as seen in FIGS. 8 and 9 to form a picture frame corner joint.

Figure 4:
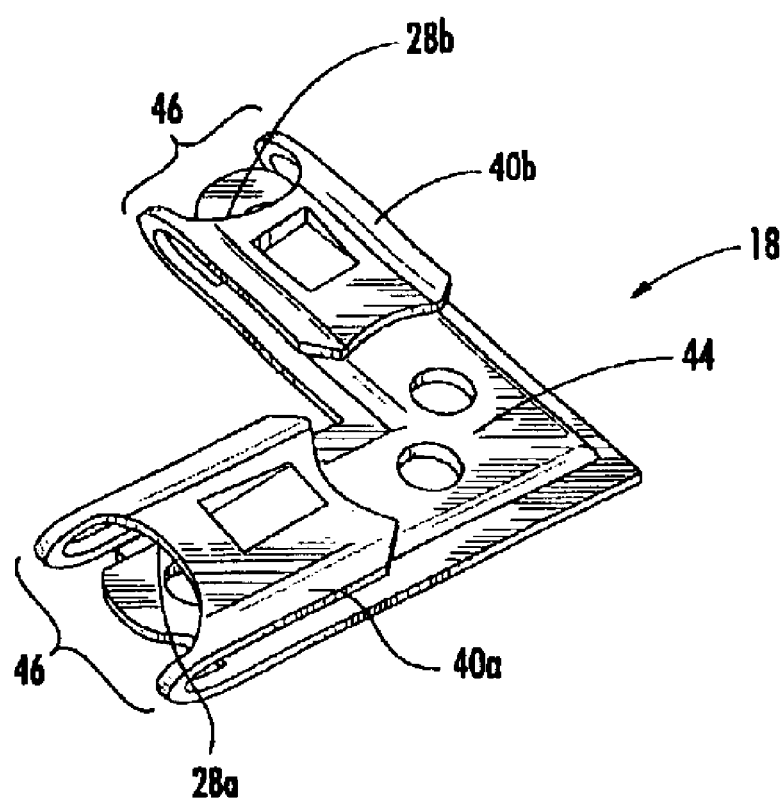
FIG. 4 is a perspective view of an impact sensitive connector employed in the present invention.
Figure 5:
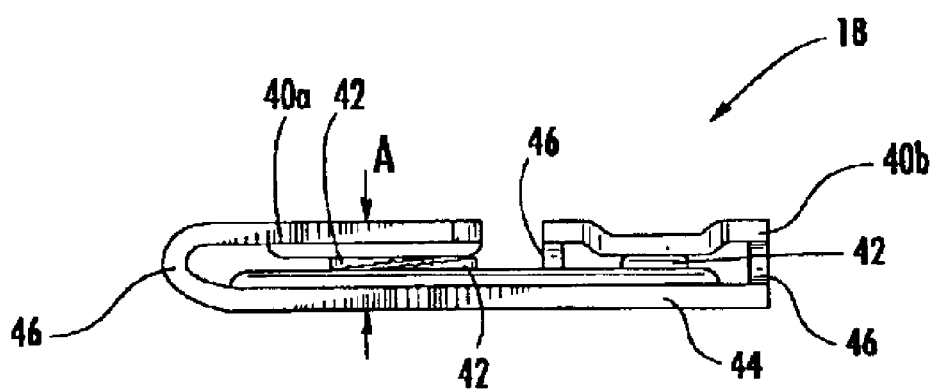
FIG. 5 is a front elevational view of the connector of FIG. 4 prior to impact by the impact pins.
Figure 10:
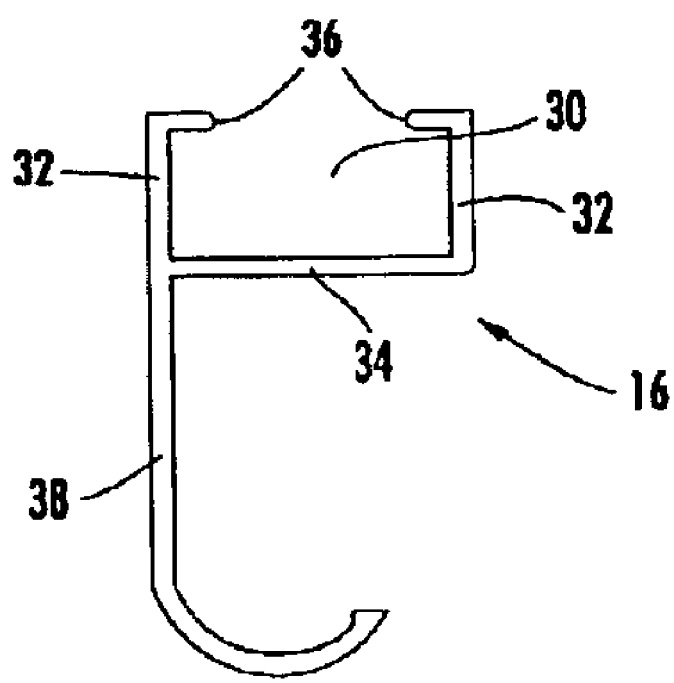
FIG. 10 is a cross-sectional view of a picture frame member.

Referring back to FIG. 4–7, details of the impact sensitive connector 18 used by the apparatus 10 of the present invention is shown. In FIG. 4, a perspective view of a sample impact sensitive connector 18 is shown prior to installation into picture frame members 16a, 16b. FIG. 5 illustrates a front elevational view of the connector 18 of FIG. 4. The connector 18 provides an expanding internal clamp to the channel 30 of a picture frame member 16a, 16b, as seen in FIGS. 8–10. FIG. 10 shows a typical profile of a picture frame member 16a, 16b which includes upstanding walls 32, floor 34 and inwardly turned flanges 36 which define the channel 30. Depending from the floor 34 is a hook member 38 for receiving the picture to be displayed along with other materials, such as glass, cardboard, and the like. Further details of the construction of this picture frame member 24 need not be discussed as they are well known in the art.

This connector 18 is one of many different types of impact sensitive picture frame joint connectors that can be employed the apparatus 10 of the present invention. By way of example and for ease of illustration and explanation, use of the connector 18 of FIG. 4–7 by the apparatus 10 of the present invention will be discussed in detail below.

The connector 18 includes a base plate 44 with wedge members 40a and 40b folded thereover so that ramped stepped surfaces 42 are in alignment with each other. Flexible hinges 46 maintain the wedge members 40a and 40b in place. In this initial condition, the surfaces 42 are not in communication with each other. As a result, the overall initial thickness of the picture frame connector 18 is shown as A. The picture frame joint connector 18 is preferably made be made of metal, such as steel, but could be made of other material.

The ends, generally referred to as 46, of the connector 100 are inserted into the channels 30 of picture frame members 16a and 16b as seen in FIGS. 8–10. The thickness A of the connector of FIGS. 4 and 5 is less than the height of the channel 30, namely the distance between the floor 34 and flanges 36 to permit the ends 46 of the connector 18, with wedge plates 40a and 40b thereon, to easily slide therein.

In FIG. 8, the connector 18 is loosely installed into the channels 30 of the two picture frame members 16a, 16b which are positioned 90 degrees relative to one another. The connector 18 is now in preparation for receiving an impact to secure it to the picture frame members 16a, 16b to thereby secure the picture frame members 16a, 16b together to form the corner joint.

Figure 14:
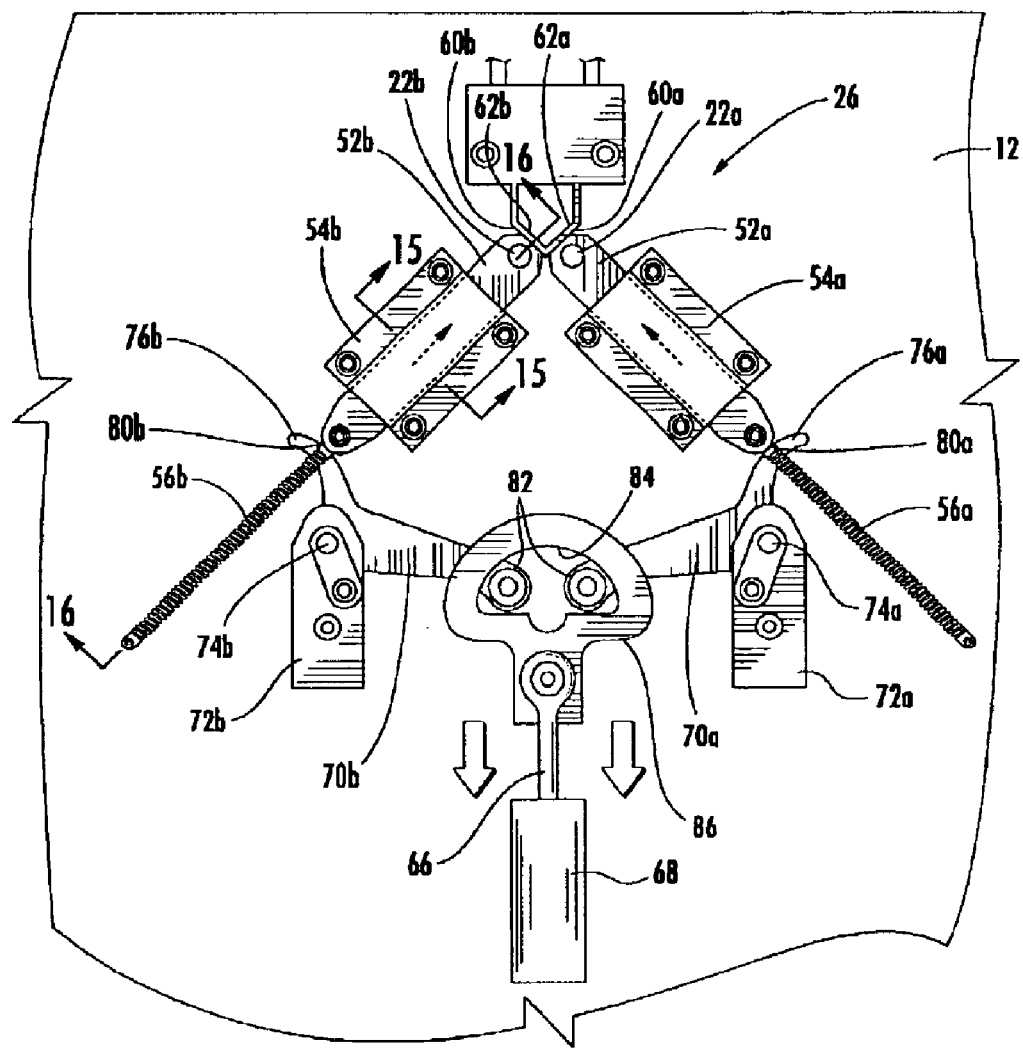
FIG. 14 is a rear view of the apparatus of FIG. 1 in an impact position.

The picture frame connector 18, employed by the apparatus 10 of the present invention is secured in place by forming an internal clamp within the channels 30 of the picture frame 16a, 16b. More specifically, referring back to FIG. 6, the wedge members 40a, 40b, for example, wedge member 40a is urged in a direction so that the stepped surface 42 of the wedge member 40a engages with the stepped surface 42 of the base plate 44 thereby increasing the thickness of the joint to thickness B which is shown in FIG. 14. Wedge plate 40b is installed in the same fashion.

Figure 6:
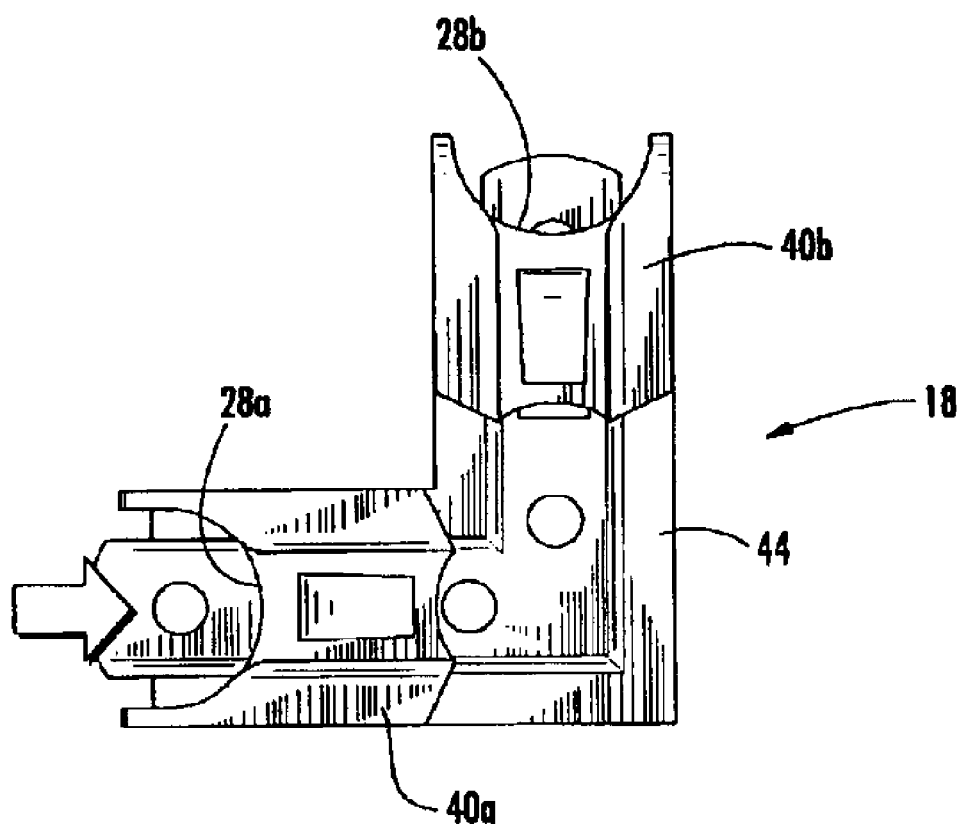
FIG. 6 is a top view of the connector of FIG. 4.
Figure 7:
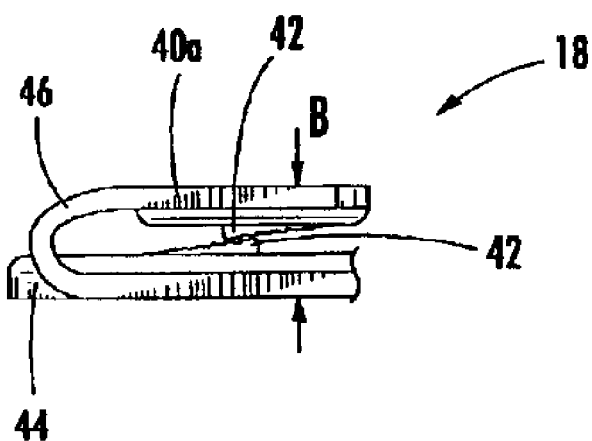
FIG. 7 is a front elevational view of an impact sensitive connector after impact by the impact pins.

A wedge plates 40a, 40b can be urged or slid over the base plate 44 in a number of different ways. As shown in FIG. 6, impact is made against edge portion 28a of the wedge plate 40a to urge the wedge plate 40a in the desired direction. In accordance with the apparatus 10 of the present invention, it is possible to simultaneously and automatically impact surfaces 28a and 28b to respectively urge both the two wedge plates 40a and 40b connected to the base plate 44 to form a complete picture frame joint in a single operation.

Figure 3:
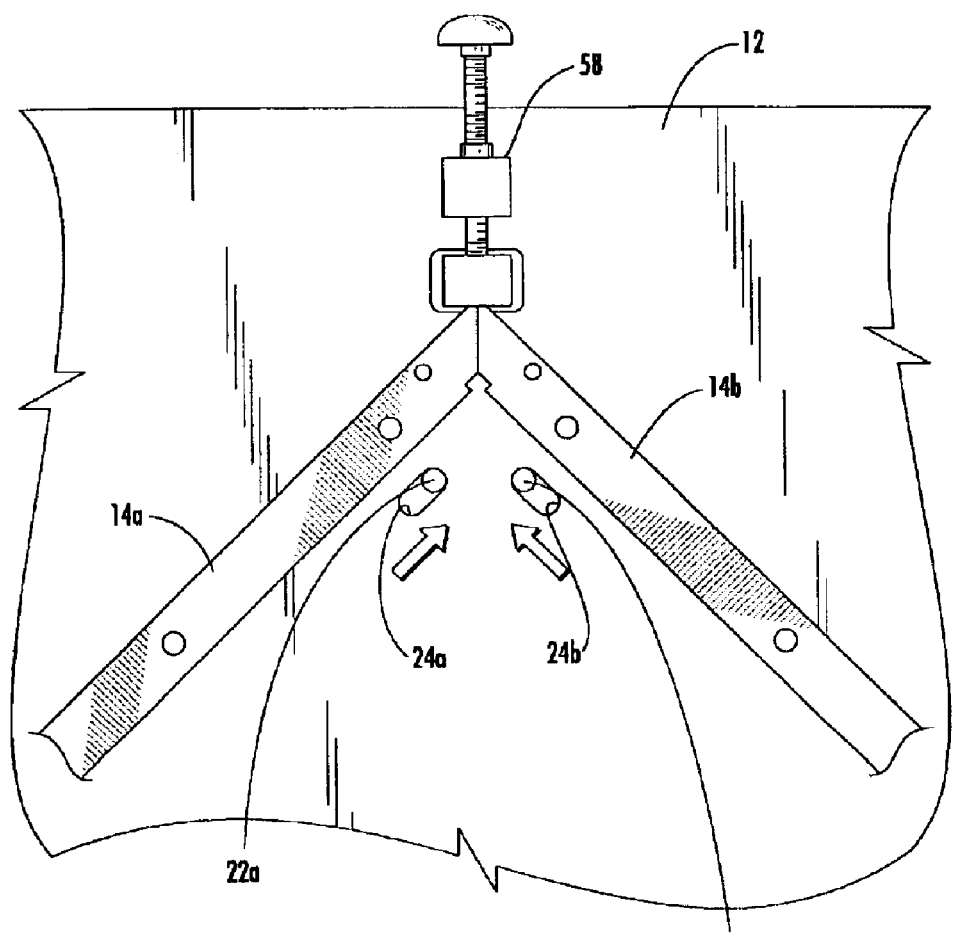
FIG. 3 is the apparatus of FIG. 2 with impact pins in an impact position.
Figure 11:
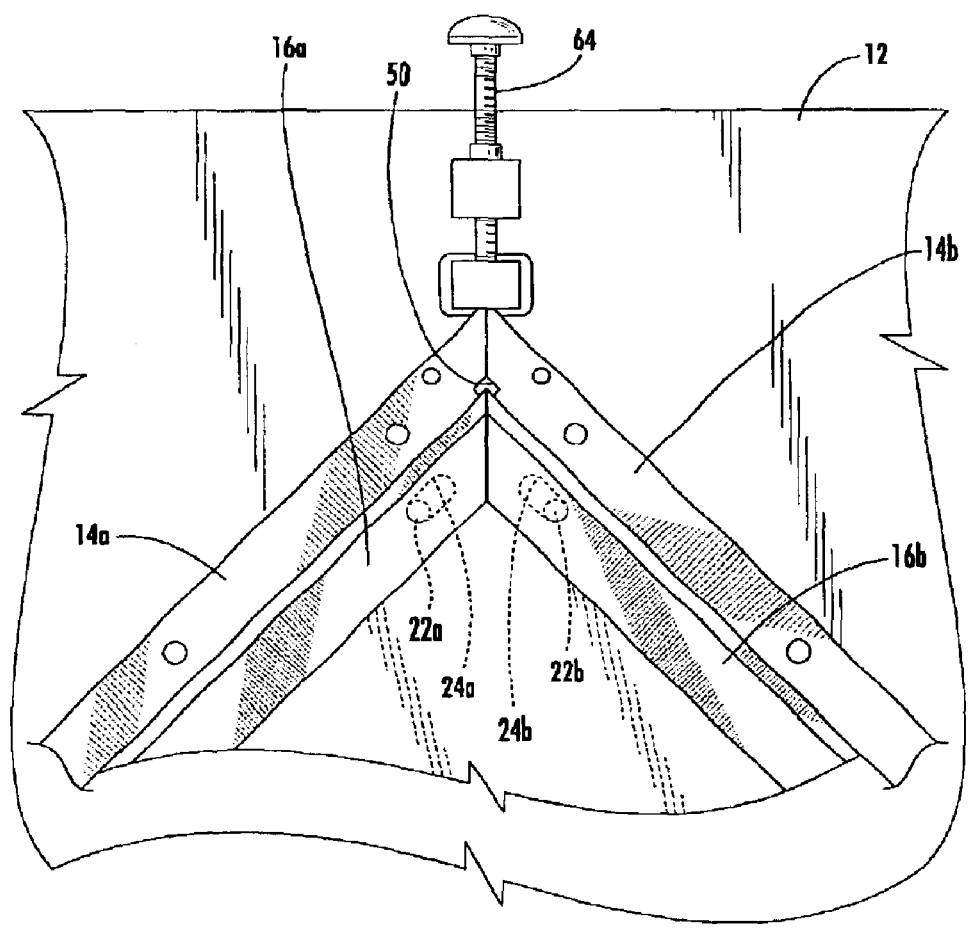
FIG. 11 is a top view of a picture frame corner joint mounted against the fences in preparation for impact by the impact pins.
Figure 12:
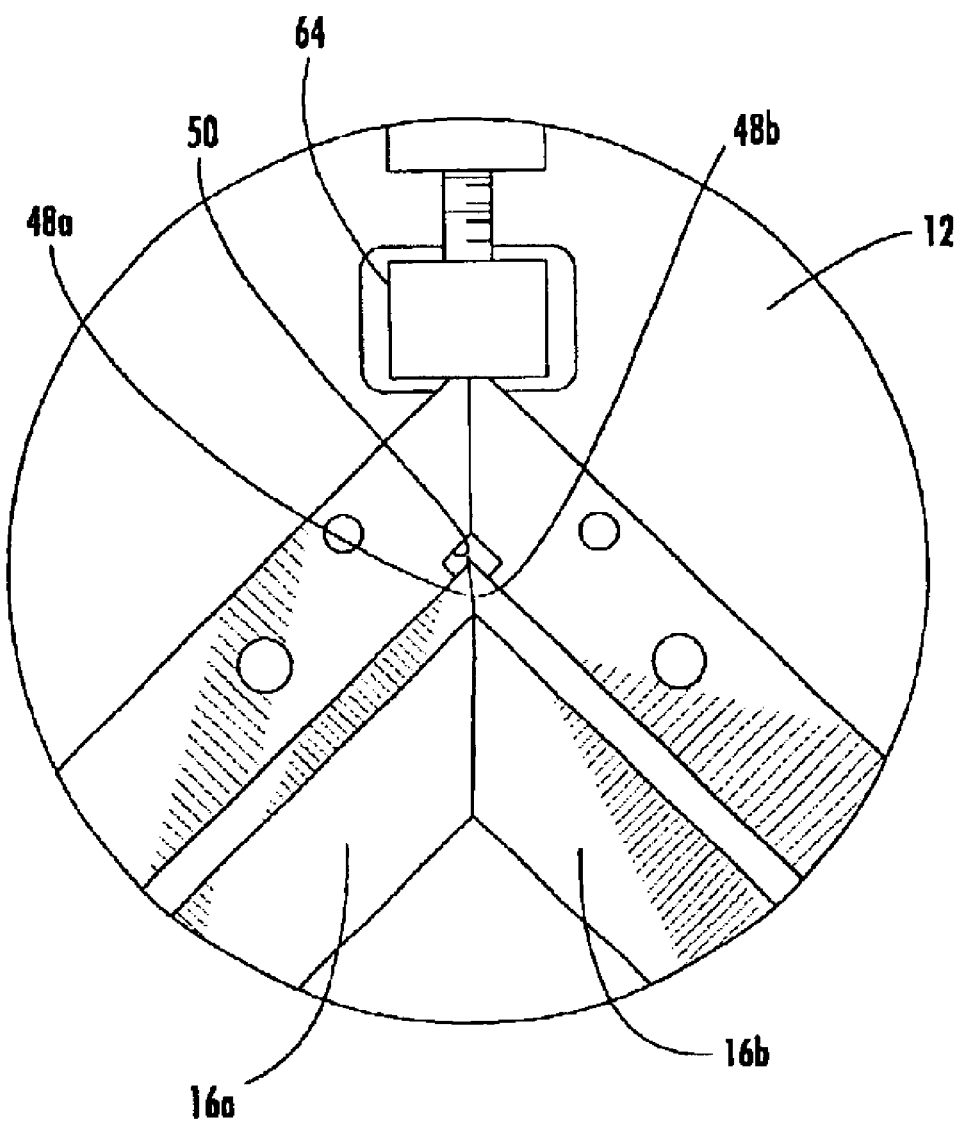
FIG. 12 is a top view of a picture frame corner joint employing the notched clearout at the apex of the fences to permit manual adjustment.

More specifically, the impact pins 22a and 22b of FIGS. 1–3 are respectively simultaneously urged into the impact surfaces 28a and 28b. FIG. 8 representationally illustrates the location of the impact pins 22a, 22b and wedge plates 40a and 40b prior to urging into the impact surfaces 28a, 28b of the connector 18. FIG. 9 representationally illustrates the location of the impact pins 22a, 22b and wedge plates 40a and 40b at the time of impact. As can be seen, the wedge plates 40a, 40b have been urged toward the corner of the joint, as indicated by the arrows, thus causing them to respectively internally clamp into the channels 30, between the flanges 36 and floor 34, of both the picture frame members 16a and 16b. FIG. 11 shows the positioning of the picture frame members 16a, 16b against their respective fence members 14a, 14b with the impact pins 22a, 22b positioned therebelow in preparation for impact against the impact surfaces 28a, 28b as in FIG. 9. As a result of the internal clamping, the picture frame members 16a, 16b are secured to one another to form a completed picture frame joint.

The present invention also permits the proper alignment and connection of picture frame members 16 that are not mitered precisely. As can be understood, the 45 degree angles of the free ends 48a, 48b of the picture frame members 16a, 16b are not accurately cut and, therefore, do not precisely line up with the corresponding mating 45 degree cut side of the opposing picture frame member. The notched clearout 50 at the top of the fence 14 allows for the sharp edges of the mating free ends of the picture frame members to be hand-adjusted prior to impact to the connector to ensure that the inner 90 degree angle formed by the picture frame members 16a, 16b is precise. As a result, a superior aesthetic appearance of the picture frame itself can be achieved even with an automated process for assembling the picture frame joint. The notched clearout 50 can be formed by provided two notches in the fences 14a and 14b that mate together form this structure. It should also be understood that it is preferred that the fences 14a, 14b are separate members that are mated together and secured to the support plate 12. However, it is also possible to form the fence 14 of a unitary structure with the notched clearout 50 a single unitary notch.

Installation using the apparatus 10 of the present invention to assemble the picture frame joint also provides a tighter miter connection resulting in a better overall picture frame assembly. As stated above, the wedge plates 40a and 40b are urged toward the miter joint corner. The frictional movement of these wedges 40a and 40b tends to push the picture frame members 16a and 16b toward one another during the installation process. As a result, the entire picture frame joint is drawn tighter when the apparatus of the present invention is used where both sides of the corner joint are installed and secured simultaneously. Such a tight corner junction cannot be achieved with a manual installation where each side of the connector 18 is installed to a given picture frame member 16a, 16b in different steps.

In view the use of an impact sensitive connector 18 to joint two picture frame members 16a, 16b to form a joint, the requisite impact force is needed to effectuate the above described internal clamping. In accordance with the present invention, impact members, preferably in the form of pins 22a, 22b, are employed for this purpose. Moreover, it is highly desirable that these pins be actuated at the same time so that both sides of the connector 18 can be secured simultaneously to secure the corner joint in a one step operation.

Figure 13:
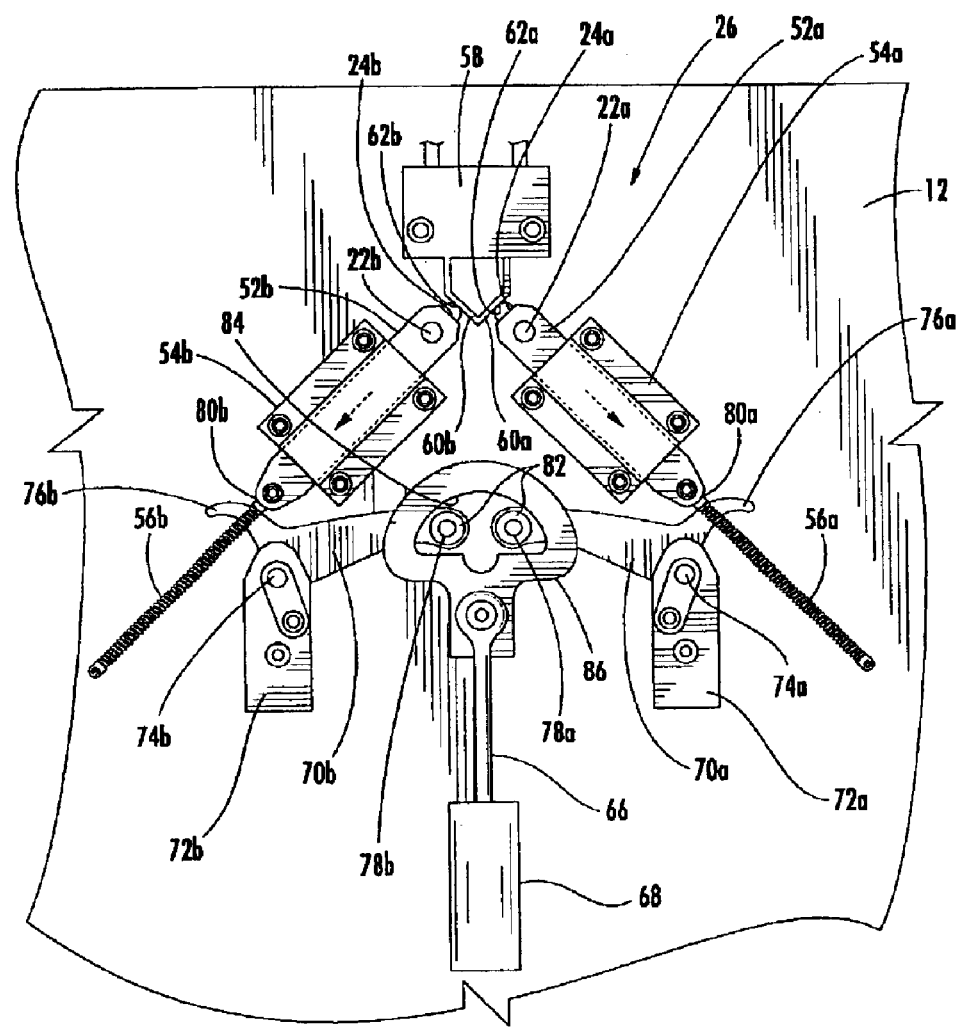
FIG. 13 is a rear view of the apparatus of FIG. 1 in a resting position.
Figure 15:
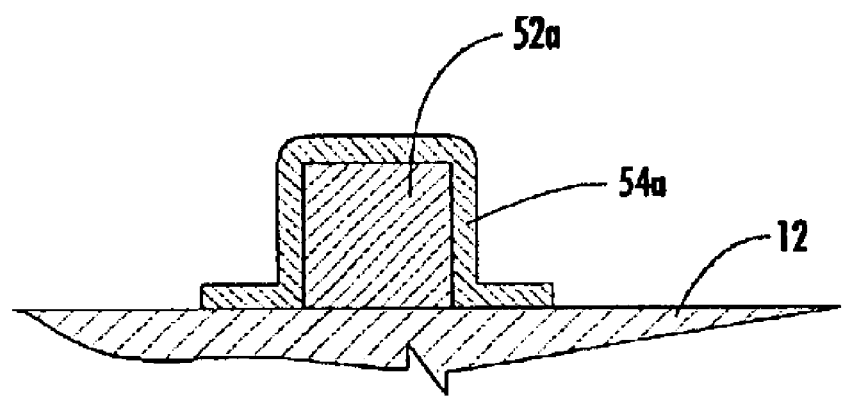
FIG. 15 is a cross-section view through the line 15—15 of FIG. 14.
Figure 16:
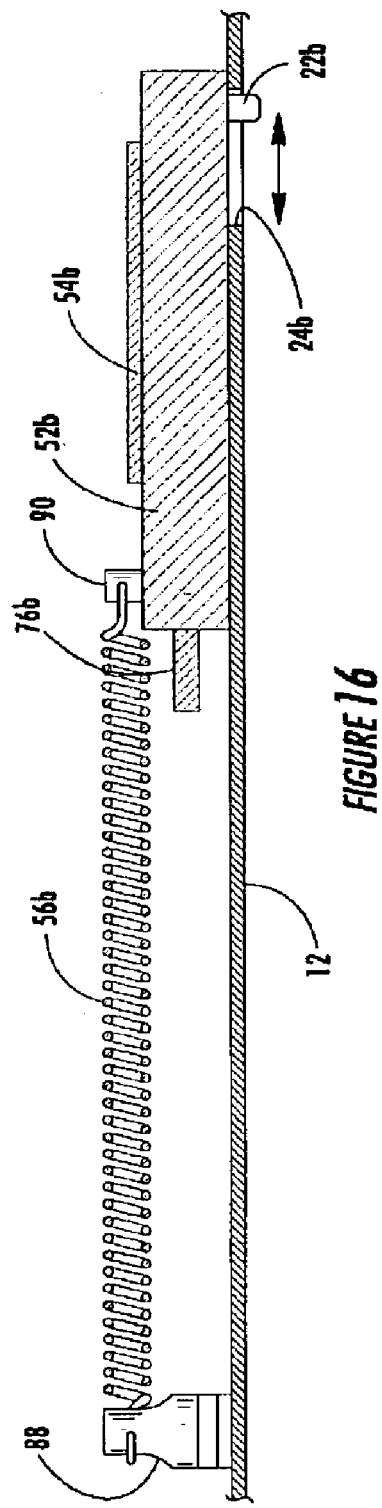
FIG. 16 is a cross-sectional view through the line 16—16 of FIG. 14.

FIGS. 13–16 illustrate in detail the mechanism 26 for actuating the impact pins 22a, 22b, as generally shown in FIGS. 2 and 3. This actuating mechanism 26 is preferably mounted on the bottom surface of the support plate 12, as seen in FIG. 13. The left impact pin 22a and the right impact pin 22b are mounted on respective trucks 52a, 52b that slidably reside in brackets 54a, 54b mounted to the bottom of the support plate 12. FIG. 15 shows a cross-sectional view through the line 6—6 of FIG. 14 to illustrate the slidable mounting of a truck 52a in bracket 54a on the bottom of the support plate 12. The trucks 52a, 52b are spring-biased, by coil springs 56a, 56b, in a downward direction to cause the impact pins 22a, 22b to be in a downward resting position, as shown in FIG. 2. In FIG. 16, a cross-sectional view through one side of the mechanism 26 is shown. The impact pin 22b is mounted to the end of truck 52b and extends through its elongated aperture 24b in the support plate 12. As indicated by the arrows, the impact pin 22b is free to actuate up against the forces of the coil spring 56b and down with the force of the coil spring 56b. One side of the coil spring 56b is connected to the support plate 12 via a first mount 88 and the other side is connected to the truck 56b via a second mount 90. The mounting and construction of impact pin 22a on the other side of the mechanism 26 is identical to the impact pin 22b discussed above.

As seen in FIGS. 13 and 14, an adjustable stop member 58 is provided with two contact surfaces 60a, 60b for respectively receiving the leading edges 62a, 62b of the trucks 52a, 52b. As a result, the forward travel against the forces of the coil springs 56a, 56b can be control by the positioning of the stop member 58 and its contact surfaces 60a, 60b. As seen in FIG. 2, for example, the stop member 58 is mounted to a hand screw 64. As the screw 64 is threaded in and out, the stop member 58 is moved up and down to control the travel of the trucks 52a, 52b and thereby the control the impact pins 22a, 22b within their respective apertures 24a, 24b and the force delivered by the impact pins 22a, 22b to the connector 18.

It is preferably the that impact pins 22a, 22b deliver a quick burst of force to drive the wedge members 40a, 40b over the base plate 44 to achieve the desired internal clamping results. For example, a force of about 150–200 lbs. is preferably used to simultaneously secure both sides of the connector 18 to the picture frame members 16a, 16b. Of course, the amount of force used will vary with the connector used and the picture frame members 16a, 16b into which the connector 18 is installed.

Moreover, it is further desirable that both sides of the connector 18 are secured at the same time. It is further desirable that only one impact source be required to obviate the need for a second source. Therefore, it is highly desirable to link the sliding movement of the trucks 52a, 52b together. For example, a preferred linkage construction is shown in FIGS. 13 and 14 where a single shaft 66 is driven up and down by an air cylinder 68, or the like. An existing air source (not shown) may be used to supply air to the air cylinder 68. Alternatively, the shaft 66 may powered by an electrically driven cylinder or by a completely mechanical construction.

A pair of impact pawls 70a, 70b are pivotally mounted to the bottom of the support plate 12 via respective housing blocks 72a, 72b at pivot points 74a, 74b. Each of the impact pawls 70a, 70b have an outer free end 76a, 76b and an inner free end 78a, 78b. The outer free ends 76a, 76b of the pawls 70a, 70b communicate with the lower ends 80a, 80b of the trucks 52a, 52b. The inner free ends 78a, 78b of the pawls 70a, 70b are equipped with rollers 82 which communicate with the inner curved surface 84 of the cam 86. This open cam linkage is preferred to permit one side to compensate for the other if one truck 52a or 52b is moving faster than the other. As a result, the open cam linkage arrangement of the present invention promotes the simultaneously impact of the impact pins 22a, 22b to the impact surfaces 28a, 28b of the connector to ensure an even and secure connection.

In FIG. 13, the trucks 52a, 52b are in a resting position with the shaft 66 in an extended position. Upon actuation of the air cylinder 68, which is of the type that pulls downwardly when actuated, the shaft 66 is drawn downwardly, as shown by the arrows in FIG. 14. As seen in FIG. 14, the pawls 70a, 70b then pivot about their respective pivot points 74a, 74b thereby driving the outer free ends 76a, 76b into the lower ends 80a, 80b of the trucks 52a, 52b. This actuation is preferably carried out in a short burst of force to drive the wedges 40a, 40b of the connector 18 as described in detail above. After actuation of the air cylinder 68, the trucks 52a, 52b will immediately reset to the downward resting position, as shown in FIG. 13, in preparation for another cycle. To facilitate fast cycling of the apparatus and to permit the operator to use both hands to maintain the picture frame members 16a, 16b with connector 18 therein against the fence, the air cylinder 68 is preferably actuated by a foot pedal (not shown).

It should be understood that the foregoing, cam linkage arrangement is just one of many different constructions that can be employed to carry out the present invention. For example, the trucks 52a, 52b that carry the impact pins 22a, 22b can be directly mechanically linked. Further, two separate synchronized air cylinders can be used where one cylinder is solely for one truck and the other is used solely for the other truck. In the preferred embodiment, the preferred air cylinder 68 moves downwardly upon actuation. Alternatively, a different linkage arrangement can be used that employs an air cylinder that moves upwardly upon actuation.

The connector 18 of the present invention requires that an impact to the impact surfaces 28a, 28b be made in a direction toward the corner of picture frame joint. However, other impact sensitive connectors (not shown) may require that the direction of the impact be away from the corner of the picture frame joint. In this case, the actuation of the trucks can be easily modified to be spring-biased upwardly in preparation for actuation in a downward direction. Still further, the pins 22a, 22b are preferably routed through respective apertures 24a, 24b through the support plate 12 so that the mechanical construction of FIGS. 13 and 14 is aesthetically hidden on the bottom side of the support plate 12. However is possible to provide the linkage construction for actuating the impact pins 22a, 22b on the top surface of the support plate 12 depending on the application at hand. Moreover, the pins 22a, 22b are shown as cylindrical in shape. However, these pins 22a, 22b may have different configurations, such as a flat anvil-like shape, to accommodate the shape of the impact surfaces 28a, 28b of the connector 18.

It should be noted that connector 18 employed by the present invention may be manufactured in many different ways and of different materials. Preferably, the connector is manufactured of steel for ease of manufacture and durability and may be anodized or otherwise chemically treated, if desired. Further, the connector 18 may be molded from other materials, such as plastic, to suit the application at hand.

It would be appreciated by those skilled in the art that various changes and modifications can be made to the illustrated embodiments without departing from the spirit of the present invention. All such modifications and changes are intended to be covered by the appended claims.

What is claimed is:

1. An apparatus for forming a picture frame joint, comprising:

a support plate;

a fence mounted on the support plate;

impact means for effectuating internal clamping of a picture frame connector held within a picture frame member; the impact means being movable from a resting position to an impact position.

2. The apparatus of claim 1, wherein the fence is a first fence member and a second fence member connected and positioned at an angle relative to one another forming a junction.

3. The apparatus of claim 2, wherein the impact means is a first pin and a second pin; the first pin being proximal to the first fence member and the second pin being proximal to the second fence member.

4. The apparatus of claim 3, wherein the first pin moves from a resting position to an impact position in a direction toward the junction forming by the first fence member and the second fence member.

5. The apparatus of claim 2, wherein the junction of the first fence member and the second fence member further define a notched clearout.

6. An apparatus for forming a picture frame joint, comprising:

a support plate having a top surface and a bottom surface; the support plate defininging an aperture therethrough;

a fence member mounted on the support plate; the fence member having a first end, a second end and an inner side; the fence member being positioned on the support plate with the aperture being proximal to the inner side of the fence member;

a slide bracket mounted on the bottom surface of the support plate proximal to the aperture;

a truck slidably residing in the slide bracket;

an impact pin, having a free end, connected to the truck and slidably residing within the aperture with the free end of the impact pin extending above the top surface of the support plate.

7. The apparatus of claim 6, wherein in the truck is spring-biased into a first position with the impact pin located in a resting position and moveable to an impact position.

8. The apparatus of claim 7, further comprising:

actuating means connected to the truck.

9. The apparatus of claim 8, wherein the actuating means is an air cylinder.

10. The apparatus of claim 6, further comprising:

a stop connected to the bottom surface of the support plate; the stop limiting sliding movement of the truck in the slide bracket.

11. An apparatus for forming a picture frame joint, comprising:
- a support plate having a top surface and a bottom surface; the support plate defining a first aperture and a second aperture therethrough;
- a first fence member mounted on the support plate; the first fence member having a first end, a second end and an inner side; the first fence member being positioned on the support plate with the first aperture being proximal to the inner side of the first fence member;
- a second fence member mounted on the support plate; the second fence member having a first end, a second end and an inner side; the first end of the first fence member being connected to the first end of the second fence member forming a corner joint; the second fence member being positioned on the support plate with the second aperture being proximal to the inner side of the second fence member; the inner side of the first fence member and the inner side of the second fence member facing one another;
- a first slide bracket mounted on the bottom surface of the support plate proximal to the first aperture;
- a first truck slidably residing in the first slide bracket;
- a first impact pin, having a free end, connected to the first truck and slidably residing within the first aperture with the free end of the first impact pin extending above the top surface of the support plate;
- a second slide bracket mounted on the bottom surface of the support plate proximal to the second aperture;
- a second truck slidably residing in the second slide bracket; and
- a second impact pin, having a free end, connected to the second truck and slidably residing with the second aperture with the free end of the second impact pin extending above the top surface of the support plate.

12. The apparatus of claim 11, wherein the corner joint of the first fence member and the second fence member further define a notched clearout.

13. The apparatus of claim 11, wherein in the first truck and the second truck are spring-biased into a first position with the first impact pin and the second impact pin respectively located in a resting position and moveable to an impact position.

14. The apparatus of claim 13, further comprising:
- cam linkage means connected to the first truck and the second truck for moving the first impact pin and the second impact pin in synchronization with one another.

15. The apparatus of claim 14, furthering comprising:
- actuating means connected to the cam linkage means.

16. The apparatus of claim 15, wherein the actuating means is an air cylinder.

17. The apparatus of claim 13, wherein the impact positions of the first pin and the second pin are closer to the corner joint than the resting positions thereof.

18. The apparatus of claim 11, further comprising:
- a first stop connected to the bottom surface of the support plate; the first stop limiting sliding movement of the first truck in the first slide bracket.

19. The apparatus of claim 11, further comprising a second stop connected to the bottom surface of the support plate; the second stop limiting sliding movement of the second truck in the first slide bracket.

20. The apparatus of claim 11, wherein the corner joint further defines an alignment notch clearout.

21. A method of forming a corner joint, comprising the steps of:
- providing a support plate having a top surface and a bottom surface; the support plate defining a first aperture and a second aperture therethrough;
- providing a first fence member mounted on the support plate; the first fence member having a first end, a second end and an inner side; the first fence member being positioned on the support plate with the first aperture being proximal to the inner side of the first fence member;
- providing a second fence member mounted on the support plate; the second fence member having a first end, a second end and an inner side; the first end of the first fence member being connected to the first end of the second fence member forming a corner joint; the second fence member being positioned on the support plate with the second aperture being proximal to the inner side of the second fence member; the inner side of the first fence member and the inner side of the second fence member facing one another;
- providing a first impact pin on the support plate;
- providing a second impact pin on the support;
- providing a first picture frame member;
- providing a second picture frame member;
- providing a connector having a first end and a second end;
- inserting the first end of the connector into the first picture frame member;
- inserting the second end of the connector into the second picture frame member;
- loosely assembling the first picture frame member, the second picture frame member and the connector together with the first picture frame member and the second picture frame member mated together;
- placing the first picture frame member against the first fence and the second picture frame member against the second fence with the first end of the connector proximal to the first impact pin and the second end of the connector proximal to the second impact pin;
- driving the first impact pin into the first end of the connector;
- driving the second impact pin into the second end of the connector;
- securing the first end of the connector to the first picture frame member;
- securing the second end of the connector to the second picture frame member; and
- securing the first picture frame member to the second picture frame member with the connector.

22. The method of claim 21, further comprising the step of:
- providing a notched clearout at the junction of the first picture frame member and the second picture frame member; and
- adjusting the mating of the first picture frame member to the second picture frame member.

23. The method of claim 21, wherein in the first truck and the second truck are spring-biased into a first position with the first impact pin and the second impact pin respectively located in a resting position and moveable to an impact position.

24. The method of claim 21, wherein the step of driving the first impact pin into the first end of the connector and driving the second impact pin into the second end of the connector are executed simultaneously.

* * * * *